United States Patent [19]
Yukihiko et al.

[11] Patent Number: 5,618,079
[45] Date of Patent: Apr. 8, 1997

[54] WINDSHIELD MOLDING FOR VEHICLES AND THE PRODUCTION METHOD THEREOF

[75] Inventors: Yada Yukihiko, Nagoya; Hirai Yoichi, Ohbu, both of Japan

[73] Assignee: Tokai Kogyo Kabushiki Kaisha, Ohbu, Japan

[21] Appl. No.: 418,894

[22] Filed: Apr. 7, 1995

Related U.S. Application Data

[63] Continuation of Ser. No. 66,009, filed as PCT/JP92/01248 Sep. 9, 1992 published as WO93/07015 Apr. 15, 1993, abandoned, which is a continuation-in-part of Ser. No. 800,831, Nov. 29, 1991, Pat. No. 5,229,054.

[30] Foreign Application Priority Data

Sep. 30, 1991 [JP] Japan ................................ 3-278583

[51] Int. Cl.$^6$ .................................................. B60R 13/06
[52] U.S. Cl. .................................... 296/93; 52/208
[58] Field of Search ......................... 296/93, 201, 208; 52/208, 400, 716.5

[56] References Cited

U.S. PATENT DOCUMENTS

| | | | |
|---|---|---|---|
| 4,884,380 | 12/1989 | Yada et al. | 296/93 X |
| 5,044,684 | 9/1991 | Yada | 296/93 |
| 5,104,173 | 4/1992 | Tamura et al. | 296/93 |
| 5,176,420 | 1/1993 | Kato | 296/93 |
| 5,190,338 | 3/1993 | Yada | 296/93 |
| 5,222,336 | 6/1993 | Yada et al. | 296/93 X |
| 5,233,805 | 8/1993 | Hirai et al. | |

FOREIGN PATENT DOCUMENTS

| | | |
|---|---|---|
| 59-114040 | 6/1984 | Japan . |
| 64-30727 | 2/1989 | Japan . |
| 3-128722 | 5/1991 | Japan . |
| 3-128721 | 5/1991 | Japan . |
| 3-143730 | 6/1991 | Japan . |

*Primary Examiner*—Joseph D. Pape
*Attorney, Agent, or Firm*—Oblon, Spivak, McClelland, Maier & Neustadt, P.C.

[57] ABSTRACT

The molding 2 is extruded while continuously changing the width and the thickness of the decorative portion 21 at the upper molding section 2A and the side molding section 2C to continuously produce the molding 2 throughout the entire length without adding cutting or other processes, and during the continuous extrusion molding, a rainwater groove 28 is provided on the inner periphery wall of the enlarged thick section 21a of the decorative portion 21. The rainwater groove 28 having a good damming function is formed with high rigidity on the decorative portion 21 at the side molding section 2C. Furthermore, the decorative portion 21 at the upper molding section 2A where no rainwater groove is formed is made thin to achieve the light weight and cost reduction of the molding. This also ensures a good driving field of view, thereby improving safety.

14 Claims, 10 Drawing Sheets

WINDSHIELD MOLDING FOR VEHICLES AND THE PRODUCTION METHOD THEREOF

This application is a continuation of application Ser. No. 08/066,009, filed as PCT/JP92/01248 Sep. 29, 1992 published as WO93/07015 Apr. 15, 1993, now abandoned, which is a continuation-in-part of application Ser. No. 07/800,831, filed on Nov. 29, 1991, and now U.S. Pat. No. 5,229,054.

TECHNICAL FIELD

This invention relates to a windshield molding for vehicles installed into the space between the periphery of the windshield glass mounted in the windshield-frame opening of the body panels of a vehicle and the body panels proper, and to the production method thereof.

BACKGROUND ART

A windshield molding is generally installed along the periphery of the windshield glass mounted in the windshield frame opening of body panels. More precisely, a long belt-shaped space is formed between the periphery of the windshield glass and the edge of the windshield opening of the body panels, and a windshield molding of a long belt-shaped extruded material is inserted into said space for sealing. The windshield molding consists of a support leg, which is inserted in the above space and engaged with a specified portion, and a decorative portion, which is provided on the outside edge of said support leg to cover the above space from the outside.

Japanese Utility Model Publication (Kohkoku) Nos. 54416/1982 and 23699/1983 have proposed that such a windshield molding for vehicles should have grooves to dam up and drain rainwater from the windshield glass. In this case, the member on which a groove is formed and that on which there is no groove are molded separately and then the members are placed into a specified injection mold to be integrated into one. With this method, however, a line is formed at their connection point due to die molding, presenting a decorative problem.

In order to eliminate such a problem, Japanese Patent Laid-Open Nos. 280019/1987 (Europe Patent Publication No. 0310262A), 283017/1987, 212121/1988, 8019/1988, 8020/1988, 8021/1988, 37914/1988, 195032/1989, (U.S. Pat. Nos. 4,865,796, 5,074,610), 291721/1988 (French Patent Publication No. 2620661, U.S. Pat. No. 4,757,660), 202518/1989, 244820/1989, 269611/1989, 269612/1989, 269613/1989 (U.S. Pat. No. 5,104,173), and Japanese Utility Model Laid-Open No. 128411/1989 have proposed that moldings should be continuously extruded throughout the entire length.

Japanese Patent Laid-Open Nos. 280019/1987 and 283017/1987 stipulate that after molding material containing a core is extruded with a constant cross-sectional shape, a dam lug is bent so as to project away from the glass at the side molding section to form a rainwater groove. In the molding described in Japanese Patent Laid-Open No. 212121/1988, the decorative portion of the molding material extruded continuously with a constant cross-sectional shape is raised by a injection molded part at the side molding section and a rainwater groove is formed on the raised portion. In the moldings described in Japanese Patent Laid-Open Nos. 8019/1988, 8020/1988, 8021/1988, and 37914/1988, the decorative portion of the molding material extruded continuously with a constant cross-sectional shape is plastic-deformed at the side molding section and a rainwater groove is formed on the deformed portion.

In the molding described in Japanese Patent. Laid-Open No. 195032/1989, after molding material is extruded with a constant cross-sectional shape, the projection forming a dam is cut off at the region where it is unnecessary. Japanese Patent Laid-Open Nos. 291721/1988 and 244820/1989 stipulate that one of the continuous groove pairs with a constant cross-sectional shape is cut off at a specified region and molding replacement is performed so that a groove is formed at the side molding section. The windshield molding described in Japanese Utility Model Laid-Open No. 128411/1989 consists of the above molding and an injection molded part inserted into a corner of this molding.

In the molding described in Japanese Patent Laid-Open No. 269612/1989, a windshield glass insertion groove and a rainwater drain groove are molded by changing the cut-off shape of the molding material extruded continuously with a constant cross sectional shape. In the windshield moldings described in Japanese Patent Laid-Open Nos. 269611/1989 and 269613/1989, the positions where a windshield glass insertion groove and a rainwater drain groove are molded are adjusted by adhering the support lug forming a glass engagement groove while changing the position where the support lug is molded with respect to the decorative portion molded to a constant cross sectional shape.

In the molding described in Japanese Patent Laid-Open No. 202518/1989, a dam is formed by changing the cross-sectional shape of the drip portion.

Each of the conventional moldings described so far have problems such as the following.

In the moldings described in Japanese Patent Laid-Open Nos. 280019/1987 and 283017/1987, the decorative portion at the upper molding section where no groove is formed is made wider than necessary. This is contrary to the requirements for light weight and cost reduction. In addition, it is not preferable from the aspect of securing a good driving field of view.

In the moldings described in Japanese Patent Laid-Open Nos. 8019/1988, 8020/1988, 8021/1988, and 37914/1988, it is difficult to mold a groove of sufficient size. They also require-more molding processes.

In the molding described in Japanese Patent Laid-Open No. 195032/1989, a sharp portion is formed on the decorative portion, requiring post processes such as rounding-off of the sharp portion. This also presents a decorative problem because the surface state after it is cut off, especially that of a glossy surface, is different from the other portion.

None of the other proposed means can continuously and easily mold a lightweight molding provided with a groove having a sufficient damming function, without waste.

The present invention intends to provide a vehicle windshield molding and production method thereof in which a rainwater drain groove having a sufficient damming function can be extruded by changing it continuously, wherein the portion where the rainwater drain groove is molded is given sufficient rigidity, and the portion without the rainwater drain groove is continuously molded in a narrow width in order to achieve light weight.

DISCLOSURE OF INVENTION

To attain the above purpose, the windshield molding for vehicles of the present invention, which is installed along the periphery of the windshield glass (11) mounted in the windshield frame opening of the body panels (12, 13), comprising:

a support leg (22) being inserted into the space between the periphery of said windshield glass (11) and the inner edge of the windshield frame opening of the body panels (12, 13); and a decorative portion (21) being provided on the outside edge of the support leg (22) to cover said space from the outside;

wherein a thick section enlarged toward the inner periphery and the outside is provided on the decorative portion (21) at the section (2C) corresponding to the side edge of the windshield glass (11);

a rainwater groove (28) is provided on the inner periphery wall of the enlarged thick section of the decorative portion (21) so as to open to the inner periphery;

the width of the decorative portion (21) in the direction perpendicular to the longitudinal direction of the molding and the thickness of the decorative portion (21) in the direction from the inside to the outside are extended more at the section (2C) corresponding to the side edge than at the section (2A) corresponding to the upper edge of the windshield glass (11); and the molding (2) is produced continuously in one piece by extrusion molding throughout the entire length.

In the production method of the windshield molding for vehicles of the present invention, the windshield molding is produced by extrusion molding using the molding forming unit (100) having an extrusion molding opening (101) for molding the decorative portion (21) which covers the space between the periphery of the windshield glass (11) and the inner edge of the windshield frame opening of the body panels (12, 13) from the outside;

wherein extrusion molding is performed using a first die (102) having an extrusion molding opening with the opening shape for the outer surface shape of said decorative portion (21); and a second die (104) installed so as to move diagonally relative to said first die (102) so that the opening area of the extrusion molding opening (101) for the decorative portion (21a) may be changed by partly shielding the extrusion molding opening (101) of the first die (102) for the decorative portion (21a), and a third die installed so as to move relative to said first die (102) so that it may enter the extrusion molding opening (101) of said first die (102) for the decorative portion (21a) from the side to partly shield the extrusion molding opening (101) and change the shielded area, comprising the steps of:

extruding the section (2C) corresponding to the side edge of the windshield glass (11), enlarging the decorative portion (21a) toward the outside and the inner periphery by diagonally moving said second die (104) so that the opening area of the extrusion molding opening (101) of said first die (102) for the decorative portion (21a) is increased;

extruding the rainwater groove (28) on the side wall of the enlarged thick section of the decorative portion (21a), allowing said third die (105) to enter the increased opening area region of the extrusion opening (101) for said decorative portion (21a) at a specified timing;

extruding the section (2A) corresponding to the upper edge of the windshield glass (11), reducing the width of the decorative portion (21a) narrower than the section (2C) corresponding to the side edge of said windshield glass by further diagonally moving said second die (104) so that the opening area of the extrusion opening (101) of said first die (102) for the decorative portion (21a) is reduced toward the inside and the outer periphery;

wherein the molding (2) is extruded continuously in one piece from the extrusion opening of the molding forming unit (100).

According to the present invention, the molding is extruded while continuously changing the width and the thickness of the decorative portion at the upper and the side molding sections to continuously produce the molding throughout the entire length without adding cutting or other processes, and during the continuous extrusion molding, a rainwater groove is provided on the inner periphery wall of the enlarged thick section of the decorative portion, as described above. Therefore, a rainwater groove with a large opening may be formed with high rigidity. Furthermore, the decorative portion at the upper molding section where no rainwater groove is formed is made thin to achieve light weight and reduced cost of the molding. This also ensures a good driving field of view, thereby improving safety.

BEST MODE FOR CARRYING OUT THE INVENTION

The following describes embodiments of the present invention according to the drawings.

Figure 1:
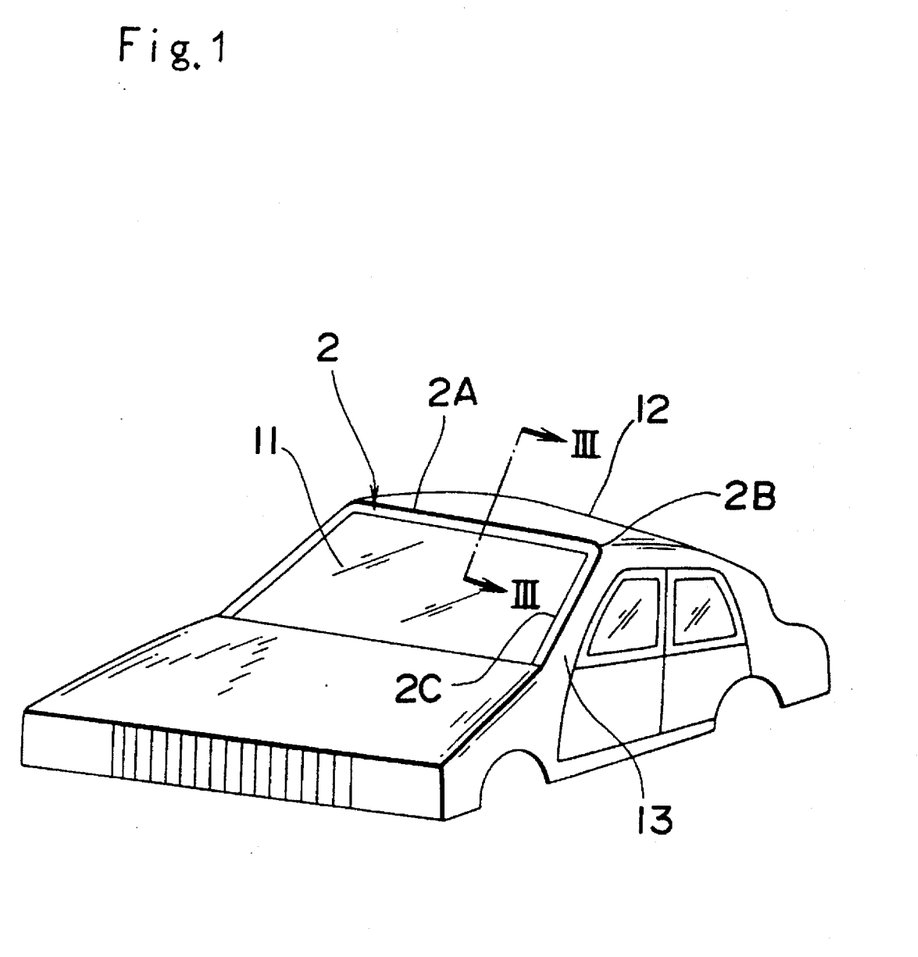
FIG. 1 is an explanatory perspective view showing an automobile front containing the windshield molding produced according to the present invention.
Figure 2:
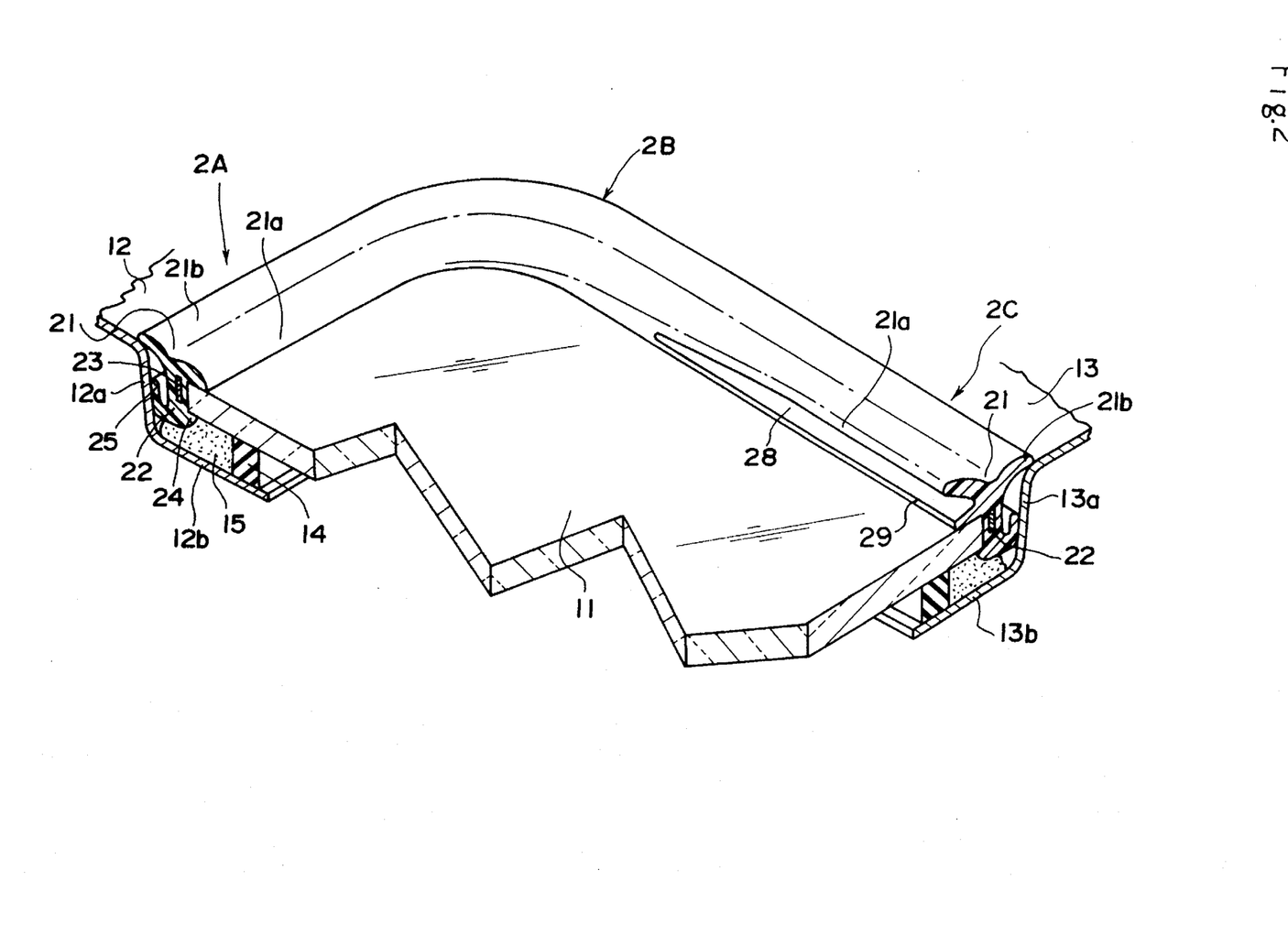
FIG. 2 is an explanatory perspective view showing the structure of the vicinity of a corner of the windshield molding in the first embodiment of the present invention.

As FIG. 1 shows, a windshield molding 2 composed of long belt-shaped extruded sealing members is installed along the periphery of the windshield glass 11 of an automobile. This windshield molding 2 is composed of the upper molding section 2A which is installed in the space between the upper edge of the above-mentioned windshield glass 11 and the roof panel 12, the side molding sections 2C which are installed in the space between both side edges of the windshield glass 11 and the pillar panels 13, and the curved corner molding sections 2B connecting the upper molding section 2A and the side molding sections 2C. These moldings, 2A, 2B, and 2C, are formed continuously as a single molding by extrusion as described later herein.

Figure 3:
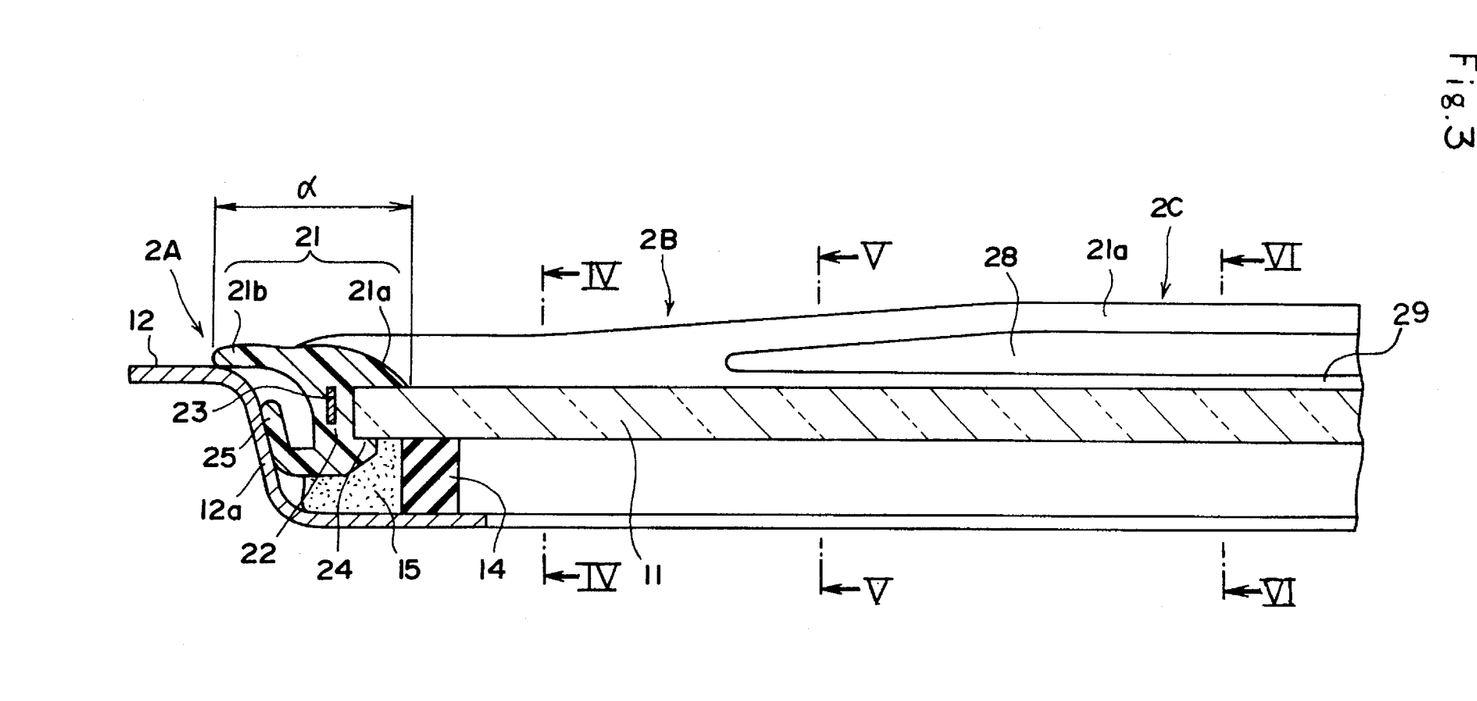
FIG. 3 is a cross-sectional view taken along the line III—III shown in FIG. 1.
Figure 4:
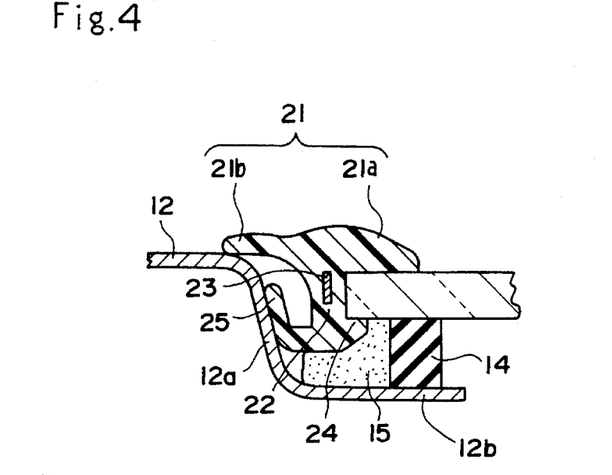
FIG. 4 is a cross-sectional view taken along the line IV—IV in FIG. 3.

The windshield molding 2 in embodiment No. 1 shown in FIGS. 2 to 6 is made of elastic material such as rubber and synthetic resin, etc., into a long belt-shaped solid molding with the extruder described later herein, is provided with the support leg 22 which is inserted in the spaces between the periphery of the windshield glass 11 and both the roof panel 12 and the front pillars 18 and is provided with the decorative portion 21 which covers the spaces between the windshield glass 11 and both the outside surface of the roof panel 12 and the front pillars 18 from the outside (the upper side of FIG. 3). The decorative portion 21 is integrally formed on the outside edge of the support leg 22. The cross-sectional shape perpendicular to the longitudinal direction, consisting of the decorative portion 21 and the support leg 22 is an approximate T shape.

A thin metal plate core 23 is buried in the upper outside edge of the support leg 22 throughout the entire length where the support leg 22 is connected to the decorative portion 21. A support portion 24 which projects toward the lower side of the windshield glass 11 is provided on the inner periphery of the inside edge (lower end in drawings) of the support leg 22. A flexible elastic lip 25 which projects toward the body panels 12 and 13 is provided on the outer periphery of the inside edge (lower end in drawings) of the support leg 22 throughout the entire length.

On the other hand, the decorative portion is provided with a glass side decorative portion 21a and a panel side decorative portion 21b, which extend from the outside edge (upper end in drawings) of the support leg 22, to the inner and the outer peripheries, respectively. The glass side decorative portion 21a is a lip-shaped member which covers the outer surface of the windshield glass 11. The panel side decorative portion 21b is a lip-shaped member which is in contact with the outer surface of the body panels 12 and 13. A groove with a U-shaped cross section is formed between the glass side decorative portion 21a and said support portion 24 to accept the windshield glass 11.

Each portion of the windshield molding 2 has basically the same cross-sectional shape along the entire periphery. The glass side decorative portion 21a is enlarged at the side section continuously in each of the width and thickness directions. In other words, on the cross section perpendicular to the longitudinal direction of the windshield molding 2, each of the support leg 22, support portion 24, elastic lip 25, and panel side decorative portion 21b is maintained to an approximately uniform shape throughout the entire length of the windshield molding 2. This is because the height difference between the outer surface of the windshield glass 11 and those of the body panels 12 and 13 is maintained uniformly throughout the entire length of the windshield molding 2. On the other hand, the glass side decorative portion 21a has variations in width and thickness from the corner molding section 2B to side molding section 2C. The width in the direction perpendicular to the longitudinal direction is increased toward the inner periphery. The thickness in the direction from the inside to the outside (vertical direction in drawings) is enlarged toward the outside. The structure of the glass side decorative portion 21a is described below.

Figure 5:
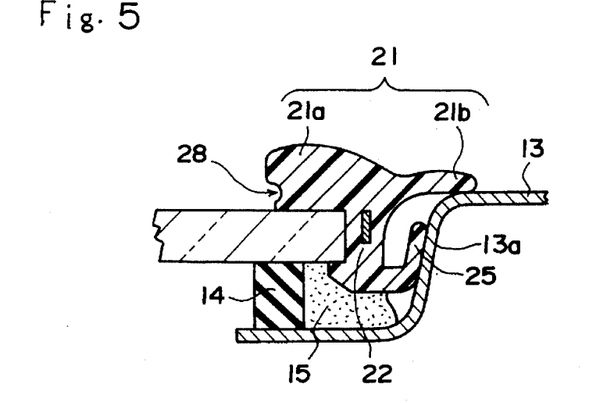
FIG. 5 is a cross-sectional view taken along the line V—V in FIG. 3.

As shown in FIG. 3, the glass side decorative portion 21a at the upper molding section 2A is maintained in uniform cross-sectional shape in the longitudinal direction and fitted on the outer surface of the upper edge of the windshield glass 11. On the other hand, the glass side decorative portion 21a from the corner molding section 2B to the side molding section 2C is gradually extended toward the inner periphery and is gradually enlarged toward the outside. At the corner molding section 2B shown in FIG. 4, the glass side decorative portion 21a is extended to the inner periphery (right side in FIG. 4) and is slightly enlarged in thickness in the vertical direction, as compared with the upper molding section 2A. As shown in FIG. 5, the glass side decorative portion 21a at the upper side of the side molding section 2C is substantially enlarged to the outside while extending slightly toward the inner periphery. At the section near the center of the side molding section 2C shown in FIG. 6, the amounts of extension to the inner periphery and of enlargement to the outside, that is, the width and thickness of the glass side decorative portion 21a are at the maximum. The maximum width and thickness of said glass side decorative portion 21a are maintained constant along the lower side of the side section. Supposing that the width of the molding at the section near the center of the side molding section 2C shown in FIG. 6 to be β and the width of the molding at the upper molding section 2A shown in FIG. 3 to be α,α and are in the relationship β>α. The thick section of this glass side decorative portion 21a that is enlarged to the inner periphery and the outside is formed so that the outer surface is a twisted one along its length. In other words, the glass side decorative portion 21a is enlarged to the outside so as to rotate with a specified line segment as the diameter, the outer surface of the glass side decorative portion 21a forming a twisted surface with said continuous rotation line segment.

The inner periphery wall of the enlarged thick section of said glass side decorative portion 21a is made in an arc-shaped curved face. The center axis of this arc-shaped curved face is set to a constant axis extending in the longitudinal direction of the windshield molding 2. Said center axis is positioned directly above the boundary between the glass side decorative portion 21a and panel side decorative portion 21b.

Figure 6:
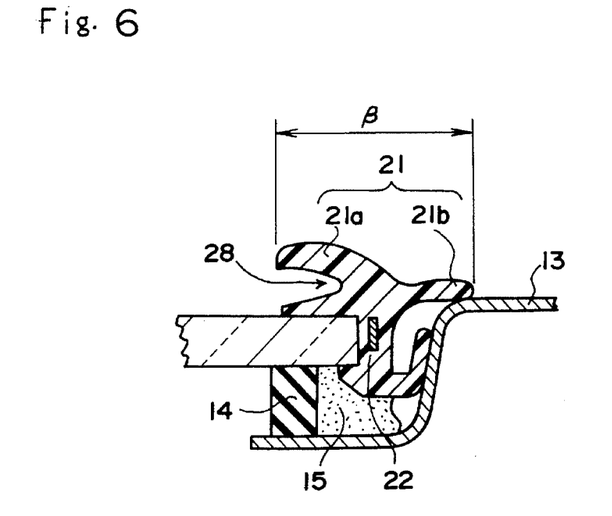
FIG. 6 is a cross-sectional view taken along the line VI—VI in FIG. 3.

Rainwater groove 28 is provided on the arc-shaped inner periphery wall of said glass side decorative portion 21a so as to open to the inner periphery (left side in drawings in FIG. 6). Rainwater groove 28 is made in an approximately triangular cross-sectional shape and is provided corresponding to the thickness of said enlarged thick section. In other words, the depth and width of the rainwater groove 28 are changed in proportion to the enlarged amount of the glass side decorative portion 21a. Said rainwater groove 28 appears from the section (see FIG. 5) near the corner of the side molding section 2C. The cross-sectional area of the rainwater groove is maximum at the approximate center section (see FIG. 6) of the side molding section 2C in the longitudinal direction. A constant cross-sectional shape is maintained from here to the lower area.

The wall at the lower side which forms said rainwater groove 28 is formed on the glass protector 29 contacting the windshield glass (11).

When installing this windshield molding 2, the windshield molding 2 is installed along the periphery of the windshield glass 11. At this time, a U-shaped groove between the support portion 24 of the upper molding section 2A and the glass side decorative section 21a is inserted from the upper periphery section to the corner periphery section of the windshield glass 11. At the same time, a U-shaped groove between the support portion 24 of the side molding section 2C and the glass side decorative portion 21a is fitted over the side periphery section of the windshield glass 11. The corner molding section 2B is curved to the specified bending rate as the windshield molding 2 is installed, but since the glass side decorative portion 21a is enlarged as described above, no wrinkles or other defects will be caused due to the difference in length of the inner and the outer bending circumferences.

On the other hand, a belt-like rubber dam 14 is adhered to the flanges 12b and 13b on the above-mentioned body panels 12 and 13, and adhesive 15 is filled by extrusion around the outer periphery of said rubber dam 14. The inner side of the windshield glass 11 on which the windshield molding 2 is installed is pressed onto the above-mentioned rubber dam 14. As a result, the support portion 24 of the windshield molding 2 is fixed with the adhesive 15, and the elastic lip 25 is bent in an L shape and fixed to the bent walls 12a and 13a. The elastic rebound force caused by bending the elastic lip 25 works as the fixing force of the windshield molding 2.

The windshield glass 11 is thus fixed on the flanges 12b and 13b on the body panels 12 and 13 at approximately the same height all-round. The windshield molding 2 is installed so as to maintain a constant relationship with respect to the outer surface of the windshield glass 11 and the surfaces of the body panels 12 and 13 throughout the entire length. As described above, the glass side decorative portion 21a is enlarged to the inner periphery and the outside at the side molding section 2C. In other words, the uniformly thin glass side decorative portion 21a is installed in a uniform state throughout the entire length of the upper molding section (see FIG. 3). The glass side decorative portion 21a is gradually enlarged to the inner periphery and the outside from the halfway of the corner molding section to the side molding section (see FIGS. 4 and 5). The enlarged amount of said glass side decorative portion 21a is increased to the maximum toward the center area of the side molding section (see FIG. 6). Toward the lower area of the side molding section, the maximum enlarged state of the glass side decorative portion 21a is maintained constant.

In the case of the said structure for installing the windshield glass 11 on the vehicle body, rainwater falling on the windshield glass 11 is led to the inner peripheral wall of the glass side decorative portion 21a and the rainwater collected in the side molding section is led through the rainwater groove 28 and drained at the specified portion.

Windshield molding 2 installed on the windshield glass 11 may be inserted into the windshield opening, or after inserting the windshield glass 11 into the windshield frame in advance, the windshield molding may be inserted into the space between the periphery of the windshield glass 11 and the body panels 12 and 13.

The following explains the device for forming the above-mentioned windshield molding 2.

As FIGS. 7 to 10 show, the molding forming unit 100 is fitted with three dies having openings for extruding synthetic resin. These dies are first die 102, second die 104, and third die 105 arranged in the molding extruding direction (vertical direction on the paper). The first die 102 is fixed and has an extrusion opening 101 having an opening shape for the entire windshield molding 2. At this time, the section for forming the glass side decorative portion 21a takes the opening shape corresponding to the glass side decorative portion of maximum enlargement without rainwater groove 28, and is formed in an approximate sectorial shape as viewed from the front.

The second die 104 and the third die 105 are made of plate-like members respectively, and are supported in front of the first die 102 so as to be able to move respectively. The second die 104 is formed in an approximate sectorial shape as viewed from the front. The side 104a corresponding to the radius of this sector is formed in an arc shape corresponding to the outside edge (upper edge) of the glass side decorative portion 21a. The plate section having this arc-shaped side 104a partly shields the extrusion opening 101 of the first die 102 in order to form the outer surface of the glass side decorative portion 21a. The center area of the sector-like second die 104 is positioned directly above the boundary between the glass side decorative portion 21a and the panel side decorative portion 21b and is supported with the support pin 103 so as to freely rotate with respect to said first die 102. Therefore, when the second die 104 is rotated with the support pin 103 as its center, the area of the extrusion opening 101 of the first die 102 shielded by the second die 104 is changed so as to change the extrusion opening area for the glass side decorative portion 21a.

When the second die 104 is rotated as described above, the tip of the arc-shaped side 104a draws an arc-shaped locus with the rotation center, support pin 103, as the center. The shape of the extrusion opening 101 provided on said first die 102 is set in accordance with this. More specifically, the edge 101a of the extrusion opening 101 corresponding to the inner periphery wall of the glass side decorative portion 21a is formed in an arc shape with a constant diameter along the arc-shaped locus of said the second die 104, and the locus center for drawing the arc-shaped edge 101a of the extrusion opening 101 on the first die 102 is approximately identical to the rotation center 103 of the second die 102.

Said third die 105 is supported by a pair of guides 106 so as to allow parallel motion. Connecting rod 109 is provided at the left rear end of the third die 105. This connecting rod 109 is connected to the drive motor 107 through the converter which converts rotary motion to linear motion. With the driving force from the drive motor 107, the third die 105 reciprocates between the upper molding section forming position shown in FIG. 7, the corner molding section forming position shown in FIG. 8, and the side molding section forming position shown in FIGS. 9 and 10.

A triangular shielding lug is formed at the right tip of the third die 105 so as to correspond to the rainwater groove 28 of the above-mentioned windshield molding 2. The shielding lug of the third die 105 is positioned so as to enter the extrusion opening for the glass side decorative portion 21a of the extrusion opening 101 of the first die 102. As shown in FIGS. 7 to 10, it is designed to reciprocate in parallel interlocked with the rotating and reciprocating motion of the second die 104.

The following explains the production method of the windshield molding 2 with the above-mentioned molding extruder.

To produce the windshield molding 2, the upper molding section 2A, the corner molding section 2B, and the side molding section 2C are extruded as a single molding, said single molding being produced in the order of side molding section 2C, corner molding section 2B, upper molding section 2A, another corner molding section 2B, and another side molding section 2C.

Figure 10:
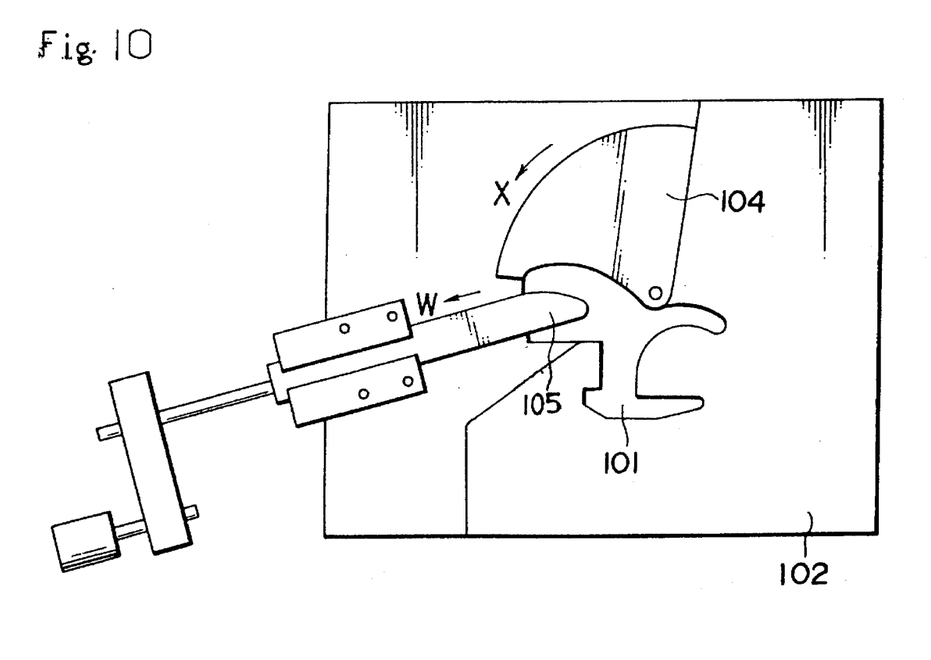
FIG. 10 is an explanatory front view showing the extruder of FIG. 7 in an even further moved state.

When the side molding section 2C is extruded, the second die 104 and the third die 105 are positioned with respect to the first die 102, as shown in FIG. 10, so that the extrusion opening 101 of the first die 102 is maintained at the maximum opening area. A band-like thin metal plate core is fed to the extrusion opening 101 of the first die 102, at the position corresponding to the support leg 22. Extrusion starts from the lower end (the right end portion in FIG. 3) of the side molding section to extrude the side molding section 2C having the cross-sectional shape shown in FIG. 6. At this time, the glass side decorative portion 21a is obtained with the cross-sectional shape of the maximum enlarged sector. Rainwater groove 28 also has the maximum triangular cross-sectional area.

After the side molding section 2C is extruded to a certain length in a certain sectional form, the second die 104 starts rotating so as to descend in the X direction in FIG. 10. With this motion, the shielded amount of the extrusion opening 101 of the first die 102 corresponding to the glass side decorative portion 21a gradually increases so that the thickness of the enlarged thick section of the glass side decorative section 21a gradually decreases. The third die 105 retracts in the W direction in FIG. 10 in proportion to the decrease in the enlarged thick section of this glass side decorative portion 21a, so that the cross-sectional area of rainwater groove 28 formed on the glass side decorative portion 21a gradually decreases. At this time, the third die 105 is moved in synchronism with the motion speed of the second die 104 in order to obtain the rainwater groove 28 whose cross-sectional area is proportional to the thickness of the enlarged thick section of the glass side decorative portion 21a.

Figure 7:
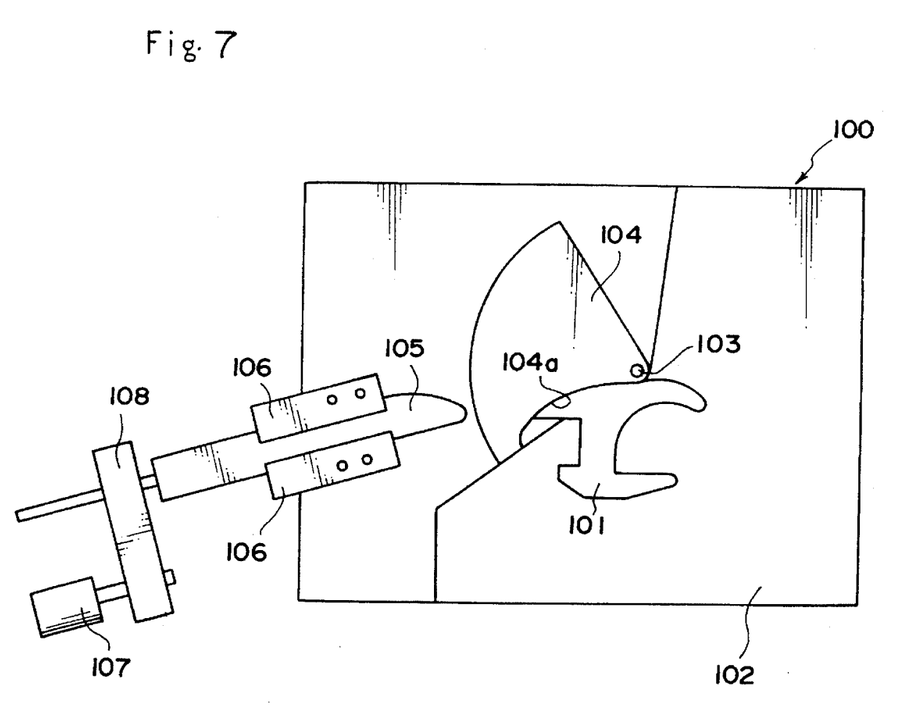
FIG. 7 is an explanatory front view showing an example of the extruder for the windshield moldings in FIGS. 1 to 6.
Figure 8:
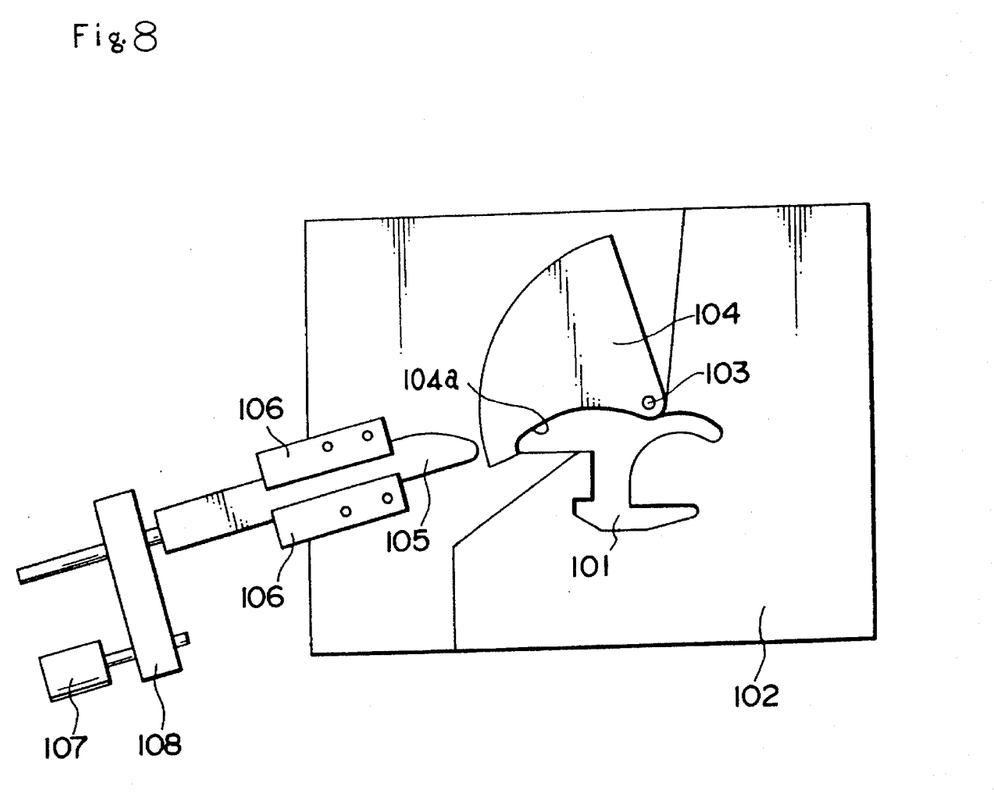
FIG. 8 is an explanatory front view showing the extruder of FIG. 7 in a moved state.
Figure 9:
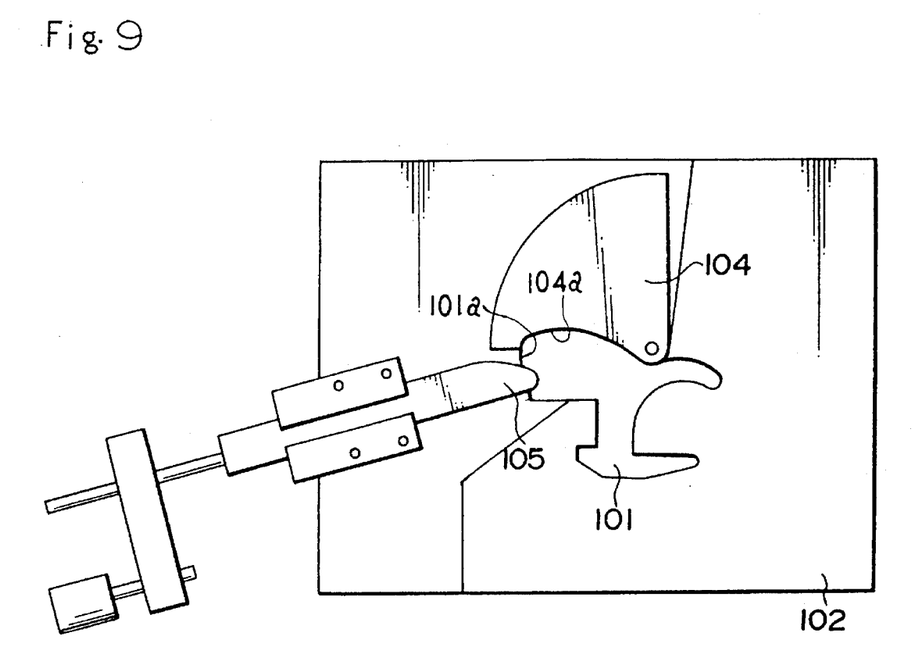
FIG. 9 is an explanatory front view showing the extruder of FIG. 7 in a further moved state.

When the forming position for the corner molding section 2B is neared, and the third die 105 is about to leave the extrusion opening 101 of the first die 102, as shown in FIG. 9, the rainwater groove 28 starts to peter out in the enlarged thick section of the glass side decorative portion 21a, as shown in FIG. 5. At the forming position for the corner molding section 2B, the second die 104 and the third die 105 are set at the positions with respect to the first die 102, as shown in FIG. 8, so that the third die 105 completely leaves the extrusion opening 101 of the first die 102 and the opening area of the extrusion opening 101 of the first die 102 is decreased. When the extrusion of the corner molding section 2B is complete, the second die 104 halts at the final decrease position, as shown in FIG. 7. Then, the extrusion opening 101 takes the shape for the cross-sectional shape of the upper molding section 2A. From this time on, the upper molding section 2A is extruded with a certain cross-sectional shape to a certain length.

When the upper molding section 2A is extruded to a certain length, the other corner molding section 2B and the other side molding section 2C are molded in the procedure opposite to the one described above. Thus, the windshield molding 2 is obtained in one piece. It should be noted that if the shielding lug of the third die 105 is of a sharp shape, a rainwater groove may be provided on a relatively thin corner molding section.

Figure 11:
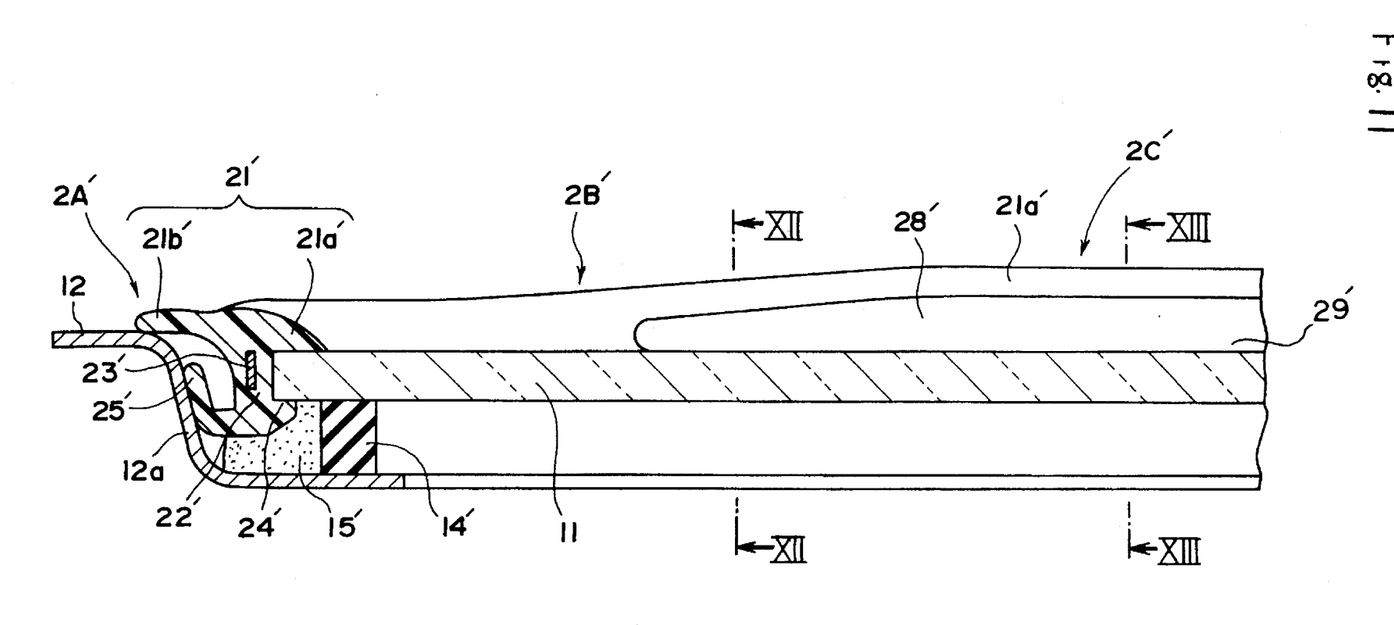
FIG. 11 shows the structure of the windshield molding in another embodiment of the present invention and is a cross-sectional view similar to FIG. 3.
Figure 12:
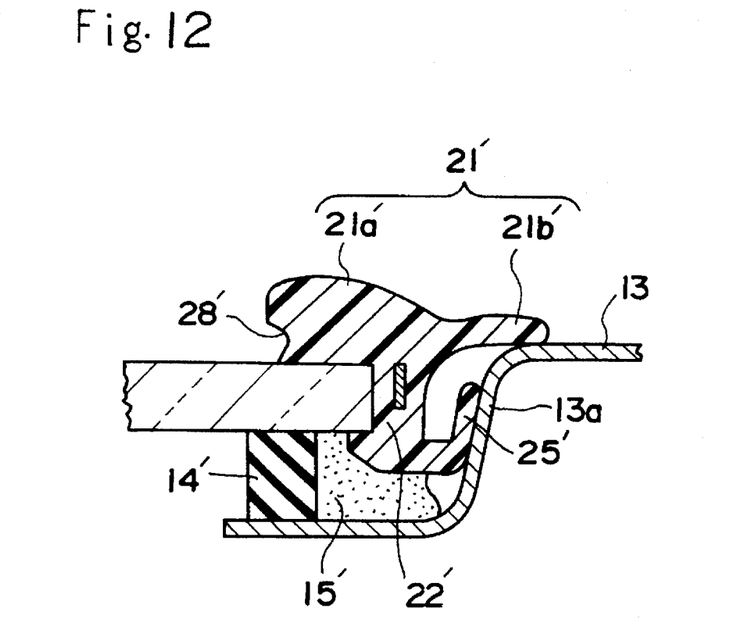
FIG. 12 is a cross-sectional view taken along the line XII to XII shown in FIG. 11.
Figure 13:
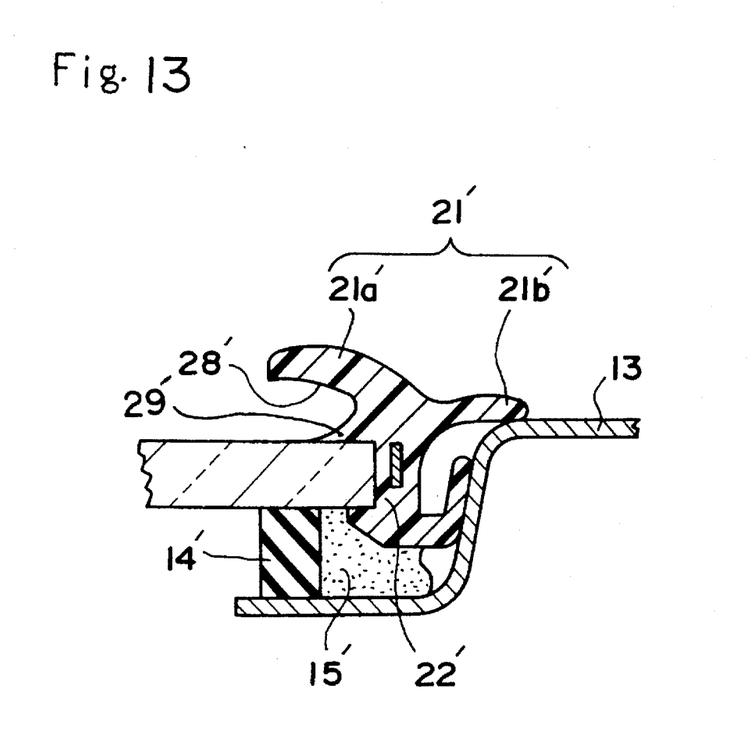
FIG. 13 is a cross-sectional view taken along the line XIII to XIII in FIG. 11.

The second embodiment shown in FIGS. 11 to 13 has basically the same configuration as the molding 2 of the first embodiment. The members in the figures corresponding to those of the first embodiment are denoted by the same numbers followed by "'". The windshield molding 2' of the second embodiment has a rainwater groove with an increased cross-sectional area compared with that of the windshield molding 2 of the first embodiment. The wall of the glass protector 29' which forms the lower side wall of the rainwater groove 28' is slightly thinner than that in the first embodiment described earlier and is narrower than the width of the glass side decorative portion 21a'. The glass contact width of the glass protector 29' on the side molding section 2C' is formed approximately the same as the glass contact width of the glass side decorative portion 21a' on the upper molding section 2A' shown in FIG. 11.

If the rainwater groove 28' is enlarged to increase the capacity as in the second embodiment, the damming and guiding functions of the rainwater groove 28 can be improved, allowing a more favorable molding to be obtained.

In the second embodiment also, the windshield molding 2' installed on the windshield glass 11 may be inserted into the windshield opening, or the windshield glass 11 inserted into the windshield frame in advance and the windshield molding 2' may be inserted into the space between the periphery of the windshield glass 11 and the body panels 12' and 13'.

Figure 14:
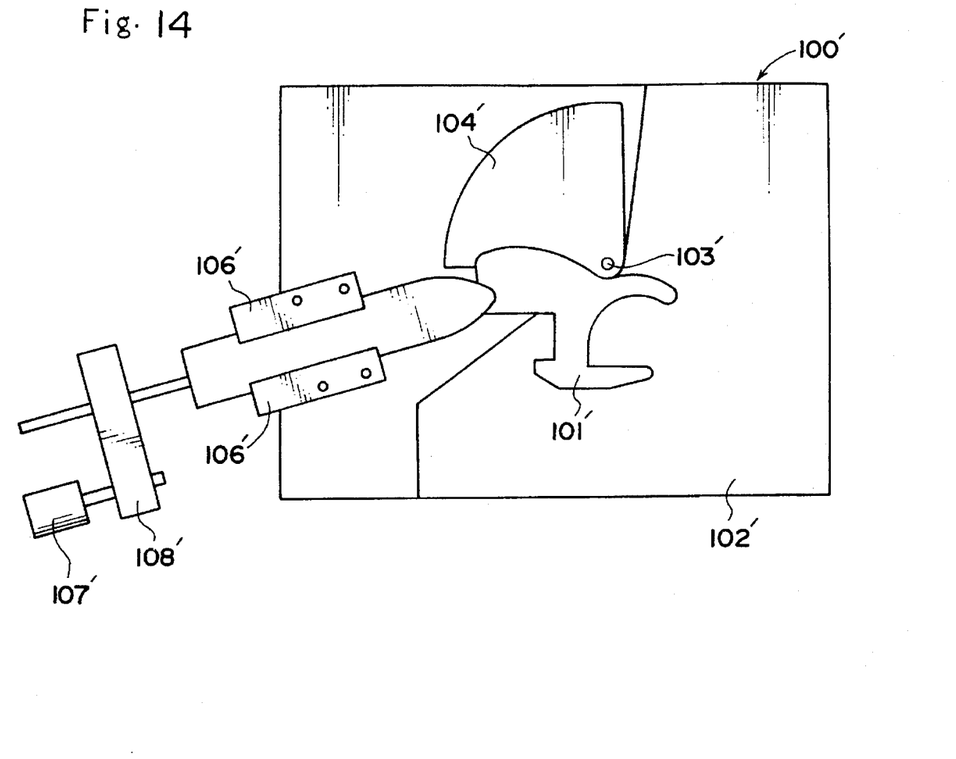
FIG. 14 is an explanatory front view showing an example of the extruder for the windshield moldings in FIGS. 11 to 13.
Figure 15:
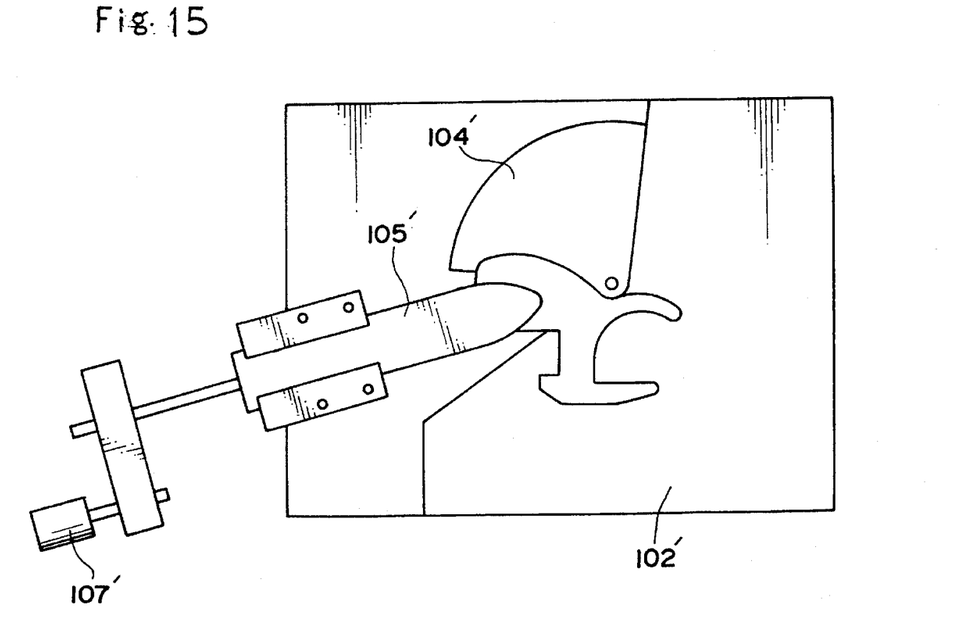
FIG. 15 is an explanatory front view showing the extruder of FIG. 14 in a moved state.

The unit for forming the windshield molding 2' shown in FIGS. 14 and 15 has basically the same configuration as the unit 100 for forming the molding 2 described earlier. The members in the figures corresponding to those of the unit 100 are denoted by the same numbers followed by "'". The forming unit 100' of the second embodiment has the third die 105' which is formed slightly wider than the third die 105 of the first embodiment. A rainwater groove 28' having a larger opening area as described above is formed because the wider the third die 105' shields a larger area of the extrusion opening 101' of the first die 102' than in the first embodiment. At the same time, the width of the glass protector 29' is decreased.

The method of forming the windshield molding 2' using this molding forming unit 100' is the same as in the first embodiment, thus explanation thereof is omitted here.

The present invention is applicable not only to the windshield glass as in each embodiment described above but also to rear window glass and other window glass in the same way.

INDUSTRIAL APPLICABILITY

The present invention is applicable to all types of windshield moldings for automobiles with rainwater grooves and is suitable to produce the whole windshield molding as a single molding without requiring additional cutting or other processes.

We claim:

1. A windshield molding for vehicles which is installed along the periphery of a windshield glass mounted in a windshield frame opening of the body panels of the vehicles, comprising a first molding section, a second molding section and a third molding section extruded continuously in one piece throughout the entire length;

said molding having a decorative portion being provided to cover said space from the outside;

said decorative portion having an outer contour surface exposed to the outside and an inner surface contacted with the windshield, said both surfaces being continuous in the longitudinal direction through the entire length;

said outer contour surface of the decorative portion being twisted along a length thereof;

wherein said decorative portion from the first molding section to the second molding section varies in width in the direction perpendicular to the longitudinal direction and in thickness in the direction from the inside to the outside, the width of said decorative portion is constant from the second molding portion to the third molding section and the thickness of said decorative portion varies in a sectorial shape from the second molding portion to the third molding section, a groove is provided in a triangular shape on the thickened inner periphery wall of the decorative portion of the third molding section.

2. A windshield molding for vehicles according to claim 1, wherein said decorative portion is divided into a lower side wall and an upper side wall by the groove.

3. A windshield molding for vehicles according to claim 1, wherein said groove is gradually reduced in width at the opening and in depth at the bottom thereof from the third molding section to the second molding section.

4. A windshield molding for vehicles according to claim 3, wherein the lower side wall of the decorative portion is reduced in width compared to the upper side wall in the third molding section.

5. A windshield molding for vehicles according to claim 4, wherein the lower side wall of the decorative portion in the third molding section is the same in width compared to that of the first molding section.

6. A windshield molding for vehicles according to claim 1, wherein said outer contour surface exposed to the outside and an inner surface contacted with the windshield of the decorative portion cross and form a wedge cross-sectional shape.

7. A windshield molding for vehicles according to claim 1, wherein said second molding section is bent toward the width direction in which the opening of said groove is the inner side of the molding.

8. A windshield molding for vehicles according to claim 7, wherein said second molding section is installed corresponding to the corner edge section of the windshield glass.

9. A windshield molding for vehicles according to claim 8, wherein said first molding section, second molding section and third molding section are each installed corresponding to the upper edge section, corner edge section and side edge section of the front windshield glass.

10. A windshield molding for vehicles according to claim 8, wherein a support leg is provided so as to be inserted in the spaces between the periphery of the windshield glass and the body panels continuously through the entire molding.

11. A windshield molding for vehicles according to claim 8, wherein a flexible elastic lip is provided so as to project toward the body panels continuously through the entire molding.

12. A windshield molding for vehicles according to claim 1, wherein said decorative portion has a portion which has the same cross-sectional shape along the entire molding.

13. A windshield molding for vehicles according to claim 8, wherein a support portion is provided so as to accept the windshield glass.

14. A windshield molding for vehicles according to claim 8, wherein a metal plate core is buried in the support leg.

* * * * *

UNITED STATES PATENT AND TRADEMARK OFFICE
CERTIFICATE OF CORRECTION

PATENT NO. : 5,618,079
DATED : April 8, 1997
INVENTOR(S) : Yada YUKIHIKO, et al.

It is certified that error appears in the above-indentified patent and that said Letters Patent is hereby corrected as shown below:

On the title page, item [30], the Foreign Application Priority Data should read:

--Sep. 30, 1991 [JP] Japan.....3-278583
  Nov. 30, 1990 [JP] Japan.....2-340853--

On the title page, item [63], the Related U.S. Application Data should read:

--Continuation of Ser. No. 66,009, filed as PCT/JP92/01248 Sep. 29, 1992 published as WO93/07015 Apr. 15, 1993, abandoned, which is a continuation-in-part of Ser. No. 800,831, Nov. 29, 1991, Pat. No. 5,229,054.--

Signed and Sealed this

Fourth Day of July, 2000

Attest:

Q. TODD DICKINSON

*Attesting Officer*     *Director of Patents and Trademarks*